W. F. STEARNS.
INSECT DESTROYER.
APPLICATION FILED JULY 29, 1912.
1,065,742.
Patented June 24, 1913.
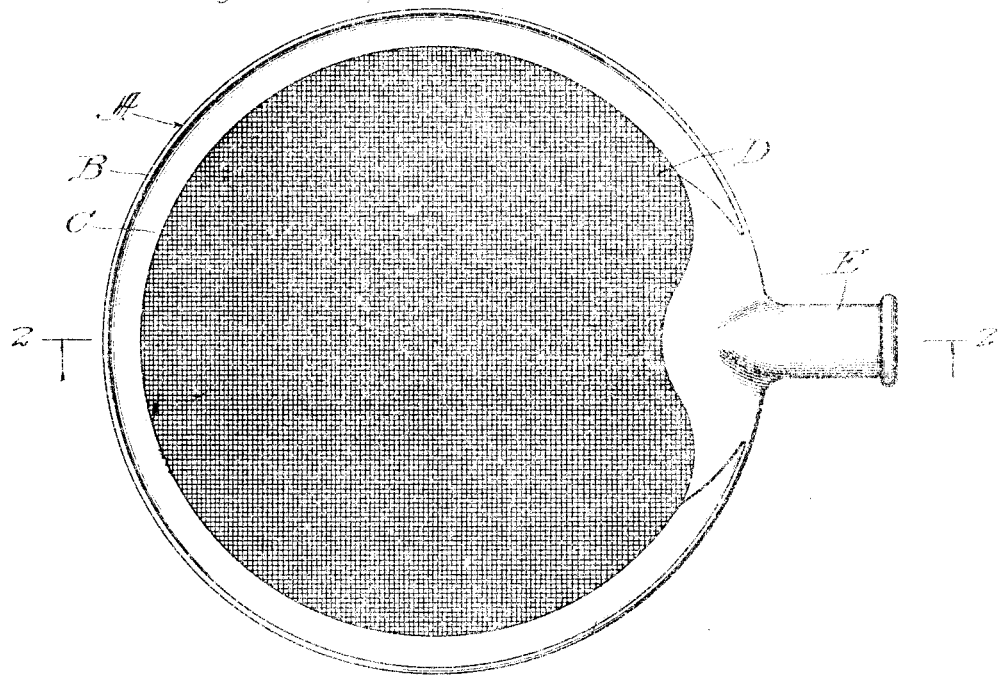
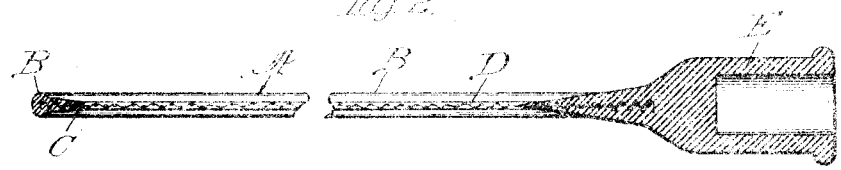
Witnesses:
Robert A. Weir
Arthur J. Harder
Inventor
William F. Stearns
Rudolph M. ___
Atty

UNITED STATES PATENT OFFICE.

WILLIAM F. STEARNS, OF EVANSTON, ILLINOIS.

INSECT-DESTROYER.

1,065,742.  Specification of Letters Patent.  Patented June 24, 1913.

Application filed July 29, 1912. Serial No. 712,046.

*To all whom it may concern:*

Be it known that I, WILLIAM F. STEARNS, citizen of the United States, residing at Evanston, in the county of Cook and State of Illinois, have invented certain new and useful Improvements in Insect-Destroyers; and I do hereby declare the following to be a full, clear, and exact description of the invention, such as will enable others skilled in the art to which it appertains to make and use the same.

This invention has for its object to provide an improved device for destroying flies and other insects, and consists in the features of construction and combinations of parts hereinafter fully described and particularly claimed.

In the accompanying drawings illustrating the invention: Figure —1— is a view in elevation of an insect destroying device embodying my invention. Fig. —2— is a central vertical longitudinal section of the same on the line 2—2 of Fig. —1—, the same being partly broken away.

My invention has for its primary object to provide a device by means of which flies and other insects settling upon walls and furniture may be struck and killed without injury to said walls and furniture and without mashing the insect so as to produce blood spots.

A further object of the invention is to provide a device of the character described which may be readily and thoroughly cleansed so as to render it at all times sanitary.

A further object of the invention is to provide a device of this character having a relatively large insect striking area and which, while presenting a very light striking surface, is provided with a flexible frame of sufficient weight to give it momentum to overcome atmospheric resistance in motion whereby effective use thereof is facilitated.

The device comprises a frame portion A preferably made of rubber or similar vulcanizable relatively heavy material. This frame is preferably made circular but may be of any other suitable shape without departing from the invention.

In cross-section the said frame A comprises a relatively heavy or beaded outer edge or peripheral portion B from which a flange C, preferably tapered, extends inwardly. This flange receives the edge portion of a foraminous body portion D. The latter consists preferably of a suitable wire cloth or netting but any foraminous material suited to the purpose may be substituted therefor.

The preferred construction contemplates vulcanizing the frame A upon the peripheral or edge portion of the member D. This is suitably accomplished in a mold constructed for the purpose and affords a far better and more durable connection between the said portions A and D than could otherwise be obtained.

To further promote strength and durability and to obviate the withdrawal of strands or wires of the body D from the frame portion A the said peripheral portion of said body D may be crimped or corrugated annularly contiguous to its periphery and such crimped or corrugated portion molded into the frame A. The said frame A is equipped at one point with a handle socket E which is preferably integral therewith and is adapted to receive a suitable stick upon which the device is adapted to be carried. The portion of the frame A contiguous to the handle socket E is preferably rendered wider and thicker than the remainder thereof, being gradually increased in thickness from a plurality of points in its surface in any suitable manner to render the connection between said member A and the handle socket E sufficiently stiff to cause yielding and bending of the portion A in striking a blow to be distributed substantially equally from the juncture with the handle socket E to the diametrically opposite point in said frame A. The particular form imparted to that portion of the frame A which meets and constitutes a part of the handle socket E is selective and may be changed and varied at will without departing from the invention.

In constructing the device in the preferred and only manner contemplated by me, which consists in vulcanizing the frame A upon the foraminous member D, the rubber will, during such vulcanization, flow through the perforations or openings in said member D and thus obviously obtain a hold upon the latter of such firmness and rigidity as to render subsequent separation difficult, thus making the device very durable. The ends of the wires of the wire cloth will also be prevented from projecting through the frame A and thus becoming exposed to prick the fingers and scratch the objects with which such ends may come in contact.

By providing the frame A with the bead or thicker outer edge or peripheral portion B the same is rendered heavier and, furthermore, said bead serves to prevent direct contact of the foraminous member D with the furniture or wall, but the flexibility of said frame permits the wire cloth to yield to more closely approach the surface upon which the frame strikes so as to strike the insect sought to be destroyed with sufficient force to effect the purpose without, however, completely crushing such insect and thus causing stains upon the walls or furniture.

In cleansing the device it may be immersed in boiling water or any desired disinfectant.

While I have pictured and described my invention in a preferred embodiment in which the body portion D is made of wire cloth or netting, I do not wish to be limited to the use of a reticulate material; it being obvious that some other form of foraminous material, might be substituted for the reticulated fabric without departing from the spirit of my invention.

I claim as my invention:

1. A device of the kind specified comprising a flat, flexible, foraminous member, a frame therefor consisting of a relatively heavy, soft, flexible, vulcanizable material, the peripheral edge portion of said foraminous member embedded in said frame, the latter continuous through the perforations in said peripheral portion of said foraminous member.

2. A device of the kind specified comprising a flat, flexible, foraminous member and a flexible frame therefor consisting of a vulcanized material completely embedding the peripheral portion of said foraminous member, the portions of said frame disposed upon opposite faces of said foraminous member continuous with each other through the perforations covered thereby.

3. A device of the kind specified comprising a flat, flexible, foraminous member and a flexible frame therefor consisting of a vulcanized material completely embedding the peripheral portion of said foraminous member, the portions of said frame disposed upon opposite faces of said foraminous member continuous with each other through the perforations covered thereby, and a flexible member integral with and projecting from said frame for attaching a handle to the latter.

4. A device of the kind specified comprising a flat, flexible, foraminous member having a corrugated edge portion, a frame therefor consisting of a relatively heavy, soft, flexible vulcanizable material, the peripheral edge portion of said foraminous member embedded in said frame.

5. A device of the kind specified comprising a flat, flexible, foraminous member having a corrugated edge portion, the frame therefor consisting of a relatively heavy, soft, flexible vulcanizable material, consisting of a relatively thick peripheral body portion and a tapering, inwardly projecting flange, the peripheral edge portion of said foraminous member embedded in said flange.

In testimony whereof I have signed my name in presence of two subscribing witnesses.

WILLIAM F. STEARNS.

Witnesses:
M. M. BOYLE,
H. L. HALE.